(12) United States Patent
Slaughter

(10) Patent No.: US 7,648,740 B2
(45) Date of Patent: Jan. 19, 2010

(54) METHOD OF MAKING IMPROVED NET-SHAPED COMPONENTS BY HYBRID METAL DEPOSITION PROCESSING

(75) Inventor: Victor Blakemore Slaughter, Manchester, MO (US)

(73) Assignee: The Boeing Company, Chicago, IL (US)

( * ) Notice: Subject to any disclaimer, the term of this patent is extended or adjusted under 35 U.S.C. 154(b) by 641 days.

(21) Appl. No.: 11/451,159

(22) Filed: Jun. 12, 2006

(65) Prior Publication Data

US 2007/0286958 A1 Dec. 13, 2007

(51) Int. Cl.
*B05D 3/00* (2006.01)
*B05D 3/06* (2006.01)

(52) U.S. Cl. .................................. 427/551; 427/552

(58) Field of Classification Search ............... 427/551, 427/552, 534; 219/121.18
See application file for complete search history.

(56) References Cited

U.S. PATENT DOCUMENTS

| 7,073,561 B1 * | 7/2006 | Henn | 164/94 |
| 2005/0173380 A1 * | 8/2005 | Carbone | 219/121.31 |

* cited by examiner

*Primary Examiner*—Roberts Culbert

(57) ABSTRACT

The invention is directed to a method of making improved net-shaped components by a hybrid metal deposition process for either hot or cold metals. The method involves using a metal deposition machine to deposit at least one layer of a metal alloy onto a top surface of a substrate to form a component part, and to cut the component part with a cutting component, such as an electron beam gun to form a predetermined net-shaped component part. Preferably, the number of layers deposited equals the number of layers cut.

20 Claims, 1 Drawing Sheet

METHOD OF MAKING IMPROVED NET-SHAPED COMPONENTS BY HYBRID METAL DEPOSITION PROCESSING

BACKGROUND OF THE INVENTION

1) Field of the Invention

The invention relates to metal deposition, and more specifically, to a method of making improved net-shaped components by hybrid metal deposition processing.

2) Description of Related Art

Metal deposition processes are fabrication techniques used by many aerospace, military, and industrial operations in order to modify metallic component parts for a variety of reasons that include restoring desired dimensions, improving abrasion resistance, improving temperature resistance, increasing corrosion protection, providing electrical shielding, and increasing conduction. Many known metal deposition processes exist. Purely metal deposition processes include shaped metal deposition, Arcam process deposition, wire electron beam deposition, and laser additive manufacturing. However, problems with purely metal deposition processes exist, such as producing component parts with a surface finish that is rough and must be finished or smoothed in order for the component part to be adequately used. The current surface finish of material in the "as-deposited" condition is too rough for use in most structural applications. In addition, after the deposition process, in order to finish the rough surface, the surface has to be sandblasted or machined to get the surface to a usable finish. This can be expensive and time consuming. Unlike the purely metal deposition processes, hybrid metal deposition processes exist that are able to produce a machined component as a product of their process. Known hybrid metal deposition processes include rapid manufacturing processes that enable net-shaped component parts to be fabricated without the need for tooling. They are typically based on the direct deposition of metal alloys using an ultrasonic welding mandrel operated by Numerical Control (automated and computer controlled machining. However, it is not practical to develop a conventional milling apparatus for use in a metal deposition machine's environment. Thus, there is a need for a method of making improved net-shaped component parts by hybrid metal deposition processing that does not have the problems associated with known deposition methods

SUMMARY OF THE INVENTION

The invention satisfies this need, as well as provides a unique and advantageous method of making improved net-shaped components by hybrid metal deposition processing. None of the known methods provides all of the numerous advantages of the invention. Unlike known metal deposition methods, the method of the invention provides the following advantages: it is easy to use, reliable, and has no tooling costs; it provides a method that represents a marked improvement to the ability of known methods to deliver a component part with a usable surface finish that does not need additional machining or sandblasting after the component part is cut after each layer of deposition; it provides a novel method for creating net-shaped component parts using deposition type technology; it provides a method for the efficient creation of net-shaped component parts; and it provides a method that is less expensive than known methods by using metal deposition processing to create component parts, especially one-off parts, without the need for post processing.

In a first embodiment of the invention, there is provided a method of making improved net-shaped component parts by a hybrid metal deposition process, where hot metal layers are cut, comprising the steps of: heating with a heating component to a first temperature a substrate having a top surface and a bottom surface; depositing at least one layer of a metal or metal alloy onto a portion of the top surface of the substrate; melting the metal or metal alloy at a second temperature with the heating component to form a component part; and, cutting the component part with the heating component to form a predetermined net-shaped section of the component part. Preferably, the heating component is an electron beam gun. The method may further comprise, after the cutting step, the steps of repeating each of the depositing, melting and cutting steps for each of a plurality of additional metal or metal alloy layers. In addition, the method may further comprise, after the cutting step, the steps of making additional cuts to the component part and removing any excess component material formed as a result of the additional cuts. In addition, the method may further comprise after a final cutting step of either a single layer part or multiple layered part, the step of cooling the net-shaped section of the component part.

In a second embodiment of the invention, there is provided a method for making improved net-shaped component parts by hybrid metal deposition processing where cold metal layers are cut. The method comprises the steps of: depositing at least one layer of a metal or metal alloy onto a portion of a top surface of a substrate to form a component part; and, cutting the component part with a cutting component to form a predetermined net-shaped component part. Preferably, the cutting component is an electron beam gun. The method may further comprise the steps, after the cutting step, of repeating the depositing and cutting steps for each of a plurality of additional metal or metal alloy layers. The method may further comprise the step, after the cutting step, of making additional cuts to the component part and removing any excess component material formed as a result of the additional cuts.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings which illustrate preferred and exemplary embodiments, but which are not necessarily drawn to scale, wherein.

DETAILED DESCRIPTION OF THE INVENTION

Figure 1:
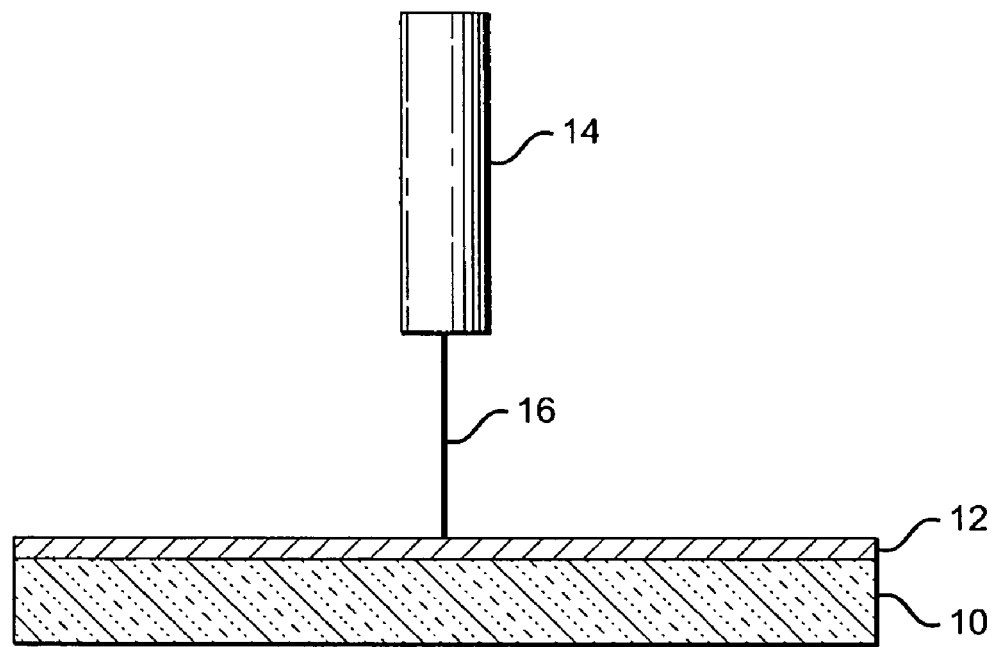
FIG. 1 is a side view illustrating components used with the invention, including an electron beam gun having an electron beam that is used to cut a component part layer on a substrate; and, FIG. 2 is a top view illustrating a net-shaped component part formed from the method of the invention having a deposited pattern and a cut path formed by an electron beam.

The invention now will be described more fully hereinafter with reference to the accompanying drawings, in which some, but not all embodiments of the invention are shown. Indeed, this invention may be embodied in several different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The invention is directed to a method of making improved net-shaped components by a hybrid metal deposition process for either hot or cold metals or metal alloys. The method involves using a metal deposition machine to deposit at least one layer of a metal alloy onto a top surface of a substrate to form a component part, and to cut the component part, preferably with an electron beam gun, to form a predetermined net-shaped component part. Preferably, the number of layers deposited equals the number of layers cut.

In a first embodiment of the invention, there is provided a method for making improved net-shaped component parts by hybrid metal deposition processing where hot metal layers are cut. The method of this embodiment comprises the step of heating with a heating component to a first temperature a substrate having a top surface and a bottom surface. Preferably, the heating component used to heat the substrate is an electron beam gun. However, the heating component may also comprise a laser or another suitable heating component. Preferably, the substrate or start plate is a metal or metal alloy substrate surface or start plate made of titanium, aluminum, vanadium, cobalt, chromium, copper, nickel, tungsten, or another suitable metal or metal alloy. Preferably, the thickness of the substrate may be between about one-quarter inch to about two inches. However, other suitable thicknesses may also be used. Preferably, the depth and width of the substrate are both less than eight inches. However, typically, the size and dimension of the substrate is dependent on the predetermined component part to be shaped and obtained. The substrate and/or part are first designed in a three-dimensional CAD (computer aided design) program. The program file is then transferred to a pre-processing software where the model is sliced into thin layers. Preferably, the pre-processing software used is a software such as Magics RP obtained from Materialise of Belgium. Preferably, the substrate is heated to a first temperature in the range of about 650 degrees Celsius to about 750 degrees Celsius. However, the heat of the first temperature may be dependent on the metal or metal alloy being deposited, and another suitable first temperature may be used.

The method further comprises the step of depositing at least one layer of a metal or metal alloy onto a portion of the top surface of the substrate. Preferably, the depositing step further comprises depositing at least one layer of a metal or metal alloy onto a two-dimensional pattern representing a section of a three-dimensional component on the top surface of the substrate. In this method, the preferred metal deposition machine used is one such as the Arcam machine, model number EBM S12 system, obtained from Arcam AB of Sweden. However, other conventional metal deposition machines may also be used. The Arcam machine provides a free form fabrication technology for direct manufacturing of fully dense parts made of metal powder. The free form technology is based on electron beam melting, and parts are manufactured by melting metal powder and building up the parts layer by layer. Preferably, the metal or metal alloy may be in the form of a powder selected from the group consisting essentially of titanium, aluminum, vanadium, cobalt, chromium, copper, nickel, tungsten, or another suitable metal or metal alloy. More preferably, the metal alloy used is titanium 6Al4V 6 Aluminum 4 Vanadium. The deposited material is preferably a pre-form of the final predetermined component part with excess material around the part. The metal is uniformly deposited onto the substrate with a rake-like device that is part of the Arcam machine. Preferably, the thickness of the metal alloy layer deposited onto the substrate is about 0.004 inches to about 0.008 inches. Preferably, the depositing step lasts less than 15-20 seconds per single layer deposited.

After an optimal layer of metal deposition is achieved, the method further comprises the step of melting the metal or metal alloy at a second temperature with a heating component to form a component part. Preferably, the heating component used to melt the metal or metal alloy and weld it to the substrate is the same electron beam gun that is used to heat the substrate. However, the heating component may also comprise a laser or another suitable heating component. The electron beam gun may be a part of the Arcam machine. The electron beam gun is preferably used in a vacuum chamber which provides a high power process and a good environment, resulting in superior material characteristics. A vacuum chamber is preferred so that the electrons have a clear path to the metal. Further, the vacuum provides a good thermal environment, leading to good form stability and controlled thermal balance in the part. Preferably, the vacuum chamber or build chamber is about 250 millimeters long, by 250 millimeters wide, by 250 millimeters high. However, the vacuum chamber may also be larger in size. Preferably, the second temperature is greater than 2000 degrees Celsius and is at a heat suitable for melting the metal or metal alloy layer. Preferably, the melting step lasts less than 15-20 seconds per single layer melted.

After the metal layer is sufficiently melted and welded to the substrate to form a component part, the method further comprises the step of cutting the component part with the heating component to form a predetermined net-shaped component part. Preferably, the heating component used to cut the component part is the same electron beam gun that was used to heat the substrate and melt the metal or metal alloy layer. However, the heating component may also comprise a laser or another suitable heating component. Preferably, the cutting step lasts less than one minute for a single layer. If the electron beam gun is used for both the melting and cutting steps, the electron beam gun makes a first pass over the deposited metal with the melting step and makes a second pass over the melted metal in order to cut the component part into a desired net shape. It is not practical to develop a conventional milling apparatus for use in the Arcam machine's environment. However, it is feasible to utilize the electron beam itself as a cutting tool on each layer. The electron beam machining cuts the component part into its net shape. Preferably, the method involves depositing n layers of a metal on a substrate and melting each of n layers on the substrate, and then cutting m layers with a cutting component, such as an electron beam gun. Preferably, n equals m, and one may cut as many layers as are deposited. However, there are instances when n would not equal m as well. The cutting of the layers is accomplished in-situ, and one or a plurality of layers can be deposited, then cut. The cut component may represent 0.004 inches to 0.016 inches of the overall build. The method may further comprise the steps of, after the cutting step, of repeating each of the depositing, melting, and cutting steps for each of a plurality of additional metal or metal alloy layers. The method is repeated until the component is complete. In addition, the method may further comprise the step of, after the cutting step, of making additional cuts to the component part and removing any excess component material formed as a result of the additional cuts. Thus, additional cuts can be made to the component part to allow for the removal of excess material. When complete, the excess material can be removed and the net-shaped component part remains. The component, including internal passages, is finish machined upon completion of the build. The total time (not including cooling) to complete the steps of the method for making a one-layer net-shaped component part is preferably less than two minutes.

The method may further comprise the step of cooling the net-shaped component part. Preferably, after a final cutting step of either a single layer part or multiple layered part, the net-shaped section of the component part may be cooled. Preferably, the cut net-shaped component part is cooled with helium, argon, or another suitable cooling agent for an effective period of time. Preferably, the cooling step lasts from about 1 hour to about 5 hours, depending on how many layers the net-shaped component part has.

In a second embodiment of the invention, there is provided a method for making improved net-shaped components by hybrid metal deposition processing where cold metal layers are cut. The method comprises the steps of depositing at least one layer of a metal or metal alloy onto a portion of a top surface of a substrate to form a component part, and cutting the component part with a cutting component to form a predetermined net-shaped component part. Preferably, the depositing step comprises depositing at least one layer of a metal or metal alloy onto a two-dimensional pattern representing a section of a three-dimensional component on the top surface of the substrate. There is no heating of the substrate or melting of the metal or metal alloy onto the substrate, and there is no cooling step. Like the above discussed embodiment, the Arcam machine is preferably used with the method of this embodiment. At least one layer of cold metal or metal alloy is deposited onto a top surface of a substrate. Preferably, the substrate or start plate is a metal substrate of the same shape, size, and material as the substrate used in the first embodiment. The size and dimension of the substrate is dependent on the predetermined component part to be shaped and obtained. Preferably, the metal or metal alloy may be in the form of a powder selected from the group consisting essentially of titanium, aluminum, vanadium, cobalt, chromium, copper, nickel, tungsten, or another suitable metal or metal alloy. More preferably, the metal alloy is titanium 6Al4V 6 Aluminum 4 Vanadium. The deposited material is preferably a pre-form of the final predetermined component part with excess material around the part. The metal is uniformly deposited onto the substrate with a rake-like device that is part of the Arcam machine. Preferably, the thickness of the metal alloy layer deposited onto the substrate is about 0.004 inches to about 0.008 inches. Preferably, the depositing step lasts less than 15-20 seconds per single layer deposited.

After the metal layer is sufficiently deposited onto the substrate to form a component part, the method further comprises the step of cutting the component part with a cutting component to form a predetermined net-shaped component part. Preferably, the cutting component used to cut the component part is an electron beam gun. However, the cutting component may also comprise a laser or another suitable cutting component. Preferably, the cutting step lasts less than one minute for cutting a single layer. Preferably, the method involves depositing n layers of a metal on a substrate and cutting m layers with a cutting component, such as an electron beam gun. Preferably, n equals m, and one may cut as many layers as are deposited. However, there are instances when n would not equal m as well. The cutting of the layers is accomplished in-situ, and one or a plurality of layers can be deposited, then cut. The cut component may represent 0.004 inches to 0.016 inches of the overall build. The method may further comprise the steps, after the cutting step, of repeating the depositing and cutting steps for each of a plurality of additional metal alloy layers. The method may further comprise the step, after the cutting step, of making additional cuts to the component part and removing any excess component material formed as a result of the additional cuts.

Figure 2:
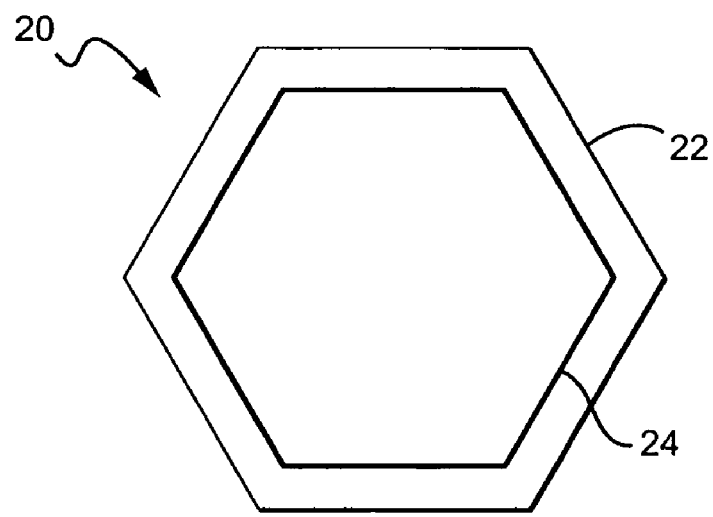

Preferably, the end product of the cut net-shaped component part used with the method of either of the above discussed embodiments has a surface roughness of between about 63 roughness height rating (rhr) to about 400 roughness height rating (rhr), where the lower the number of roughness height rating, the smoother the surface. FIG. 1 is a side view illustrating an electron beam gun 14 having an electron beam 16 that is used to cut a component part layer 12 on a substrate 10. FIG. 2 is a top view illustrating a net-shaped component part 20 having a deposited pattern 22 and a cut path 24 formed by the electron beam. Thus, the end net-shaped component part of the method of the invention requires no or very little post-process machining, has negligible distortion, and has a smooth surface finish.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of making improved net-shaped component parts by a hybrid metal deposition process, comprising the steps of:

heating with a heating component to a first temperature a substrate having a top surface and a bottom surface;

depositing at least one layer of a metal or metal alloy onto a portion of the top surface of the substrate;

melting the metal or metal alloy at a second temperature with the heating component to form a component part; and, cutting the component part with the heating component to form a predetermined net-shaped section of the component part.

2. The method of claim 1 comprising the further steps, after the cutting step, of repeating each of the depositing, melting and cutting steps for each of a plurality of additional metal or metal alloy layers.

3. The method of claim 2 comprising the further step after a final cutting step of cooling the net-shaped section of the component part.

4. The method of claim 1 comprising the further step, after the cutting step, of making additional cuts to the net-shaped component part and removing any excess component material formed as a result of the additional cuts.

5. The method of claim 1 wherein the metal or metal alloy is selected from the group consisting essentially of titanium, aluminum, vanadium, cobalt, chromium, copper, nickel, and tungsten.

6. The method of claim 1 wherein the heating component is an electron beam gun.

7. The method of claim 1 wherein the depositing step further comprises depositing at least one layer of a metal or metal alloy onto a two-dimensional pattern representing a section of a three-dimensional component on the top surface of the substrate.

8. The method of claim 1 wherein the first temperature is in a range of about 650 degrees Celsius to 750 degrees Celsius.

9. The method of claim 1 wherein the second temperature is greater than 2000 degrees Celsius.

10. The method of claim 1 wherein the thickness of the metal alloy layer deposited onto the substrate is in a range of about 0.004 inches to about 0.008 inches.

11. The method of claim 1 wherein a time to complete the steps of the method for making a one-layer net-shaped component part is less than two minutes.

12. The method of claim 1 wherein the net-shaped component part has a surface roughness of between about 63 roughness height rating (rbr) to about 400 roughness height rating (rhr).

13. A method of making improved net-shaped component parts by a hybrid metal deposition process, comprising the steps of:
depositing at least one layer of a metal or metal alloy onto a portion of a top surface of a substrate to form a component part; and,
cutting the component part with a cutting component to form a predetermined net-shaped component part, wherein the cutting component is an electron beam gun.

14. The method of claim 13 comprising the further steps, after the cutting step, of repeating the depositing and cutting steps for each of a plurality of additional metal or metal alloy layers.

15. The method of claim 13 comprising the further step, after the cutting step, of making additional cuts to the component part and removing any excess component material formed as a result of the additional cuts.

16. The method of claim 13 wherein the metal or metal alloy is selected from the group consisting essentially of titanium, aluminum, vanadium, cobalt, chromium, copper, nickel, and tungsten.

17. The method of claim 13 wherein the net-shaped component part has a surface roughness of between about 63 roughness height rating (rhr) to about 400 roughness height rating (rbr).

18. A method of making net-shaped component parts by metal deposition comprising the steps of:
depositing n layers of a metal on a substrate and melting each of n layers on the substrate; and,
cutting m layers with a cutting component, wherein n equals m and further wherein the cutting component is an electron beam gun.

19. The method of claim 18 wherein the metal is selected from the group consisting essentially of titanium, aluminum, vanadium, cobalt, copper, nickel, and tungsten.

20. The method of claim 18 wherein the net-shaped component part has a surface roughness of between about 63 roughness height rating (rhr) to about 400 roughness height rating (rhr).

* * * * *

UNITED STATES PATENT AND TRADEMARK OFFICE
CERTIFICATE OF CORRECTION

PATENT NO.        : 7,648,740 B2                                              Page 1 of 1
APPLICATION NO.  : 11/451159
DATED            : January 19, 2010
INVENTOR(S)      : Victor Blakemore Slaughter It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 862 days.

Signed and Sealed this

Twenty-third Day of November, 2010

David J. Kappos
*Director of the United States Patent and Trademark Office*